Jan. 1, 1946.  L. A. PALEY ET AL  2,392,179
FASTENER
Filed Jan. 12, 1942
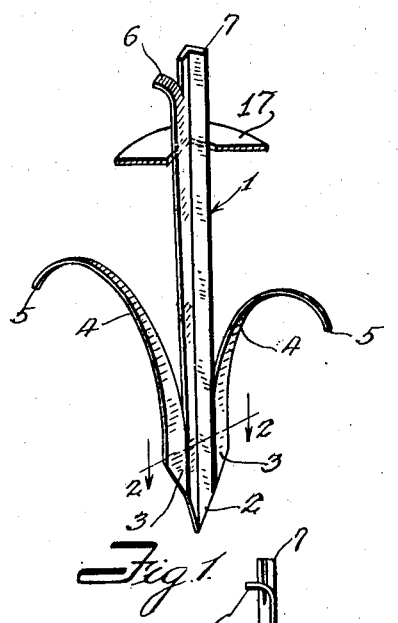
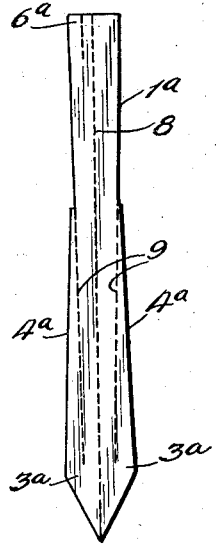
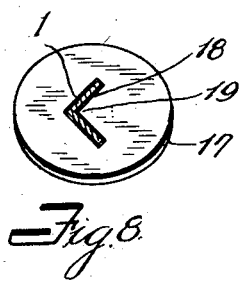
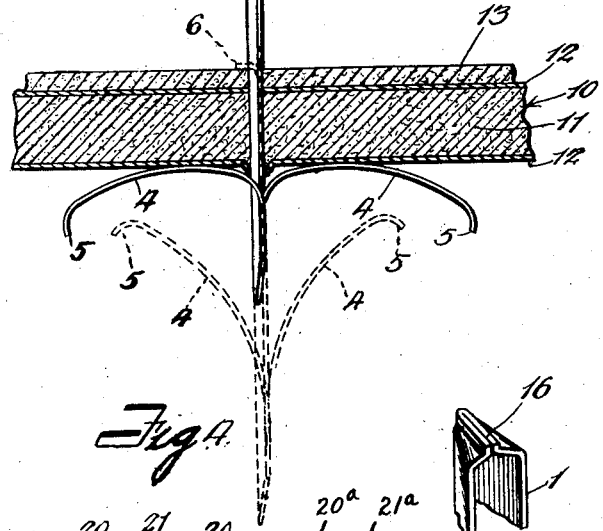
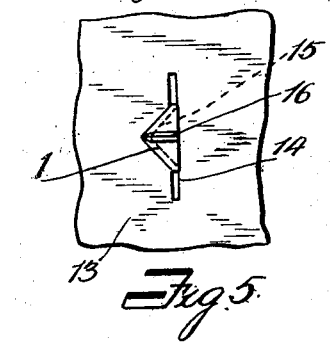
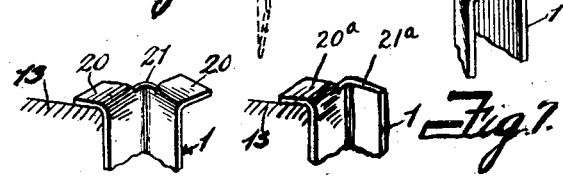
Inventors:
Lewis A. Paley.
William H. Young.

Patented Jan. 1, 1946

2,392,179

UNITED STATES PATENT OFFICE 2,392,179

FASTENER

Lewis A. Paley, Glen Ellyn, and William H. Young, Chicago, Ill., assignors to United States Gypsum Company, Chicago, Ill., a corporation of Illinois Application January 12, 1942, Serial No. 426,370

11 Claims. (Cl. 108—33)

This invention relates to fasteners for securing panels to supports, and more particularly to fasteners for securing asbestos shingles or the like to gypsum sheathing. Such shingles are ordinarily formed of hard pressed asbestos cement mixture and are very tough, strong and firm in texture, and capable of retaining a fastener secured thereto or therein. The shingles are not frangible and do not easily crumble or break away from the fastener. The gypsum sheathing, however, which forms a deck or support to which the shingles are to be secured, is substantially identical with ordinary plasterboard except that it is usually somewhat thicker and may be provided with somewhat heavier fabric cover sheets. The core of the gypsum sheathing therefore is very frangible and will not hold a nail or the like in a satisfactory manner. It has been found in practice that when asbestos shingles are secured to the gypsum sheathing by means of ordinary fasteners such as nails or the like, the shingles are easily loosened from the deck by the wind or other conditions and for this reason building structures having walls or roofs of this type have been unsatisfactory.

Ordinary fasteners after once being loosened in the gypsum sheathing, cannot again be secured in place as the core of the sheathing crumbles away from the fastener.

The invention is adapted for use in connection with various types of wall coverings and supports therefor, other than asbestos shingles and gypsum sheathing. It may satisfactorily be used with any suitable panel-like material, such, for instance, as asphalt coated wood fiber insulating sheathing; in fact, it may effectively be used for resiliently securing together sheets, strips, or the like, of almost any material capable of supporting the fastener.

It is an object of the present invention to provide a fastener which may be driven through the shingle and sheathing and secured in place by resilient pressure applied by the fastener to the back of the gypsum sheathing in such manner that wear and mutilation of the back of the sheathing will be reduced to a minimum and any variation in thickness will automatically be compensated for by the resilient pressure of the fastener.

It is also an object to provide a fastener which will apply the resilient pressure of the fastener at points remote from the shank of the fastener itself, and preferably at substantially diametrically opposite points with respect to the shank. This provides a balanced fastener and prevents tilting of the shank in the support. Also, the invention provides a fastener which may be effectively secured even when the back of the sheathing is inaccessible.

It is another object to provide a fastener of the type described which will be somewhat yieldable to wind pressure under the shingle, but will again snugly and resiliently clamp the shingle in place as soon as the pressure is relieved and without material wear on the back of the sheathing.

It is also an object to provide a new and improved method of securing a fastener of the type described so that a portion of the fastener will engage a complementary portion of the shingle to prevent the fastener from being drawn through the shingle by the resilient pressure on the opposite side of the gypsum sheathing.

Another object is to provide a one-piece fastener which may be formed of sheet or strap material and which will be cheap to manufacture, convenient in use and will snugly retain the shingles under all weather conditions.

Further objects will be apparent from the specification and appended claims.

In the drawing:

Fig. 1 is a perspective view of a fastener and illustrates one embodiment of the invention.

Fig. 2 is a detail sectional view taken on a line substantially corresponding to line 2—2 of Fig. 1.

Fig. 3 is a plan view of the sheared blank from which the embodiment shown in Fig. 1 may be formed.

Fig. 4 is a sectional view through a roof deck and illustrates one of the fasteners after being driven through the shingle and roof deck and moved to a position to be secured therein.

Fig. 5 is a top view of the embodiment shown in Fig. 4 after the protruding end of the fastener has been removed in a manner to secure the fastener in place.

Fig. 6 is a fragmentary view of a shingle and illustrates the slot made by the fastener when it is driven therethrough.

Fig. 7 is a perspective view of the cut end of the fasteners after the protruding portion has been cut off.

Fig. 8 is a perspective view of a washer adapted to be loosely mounted on the shank of the fastener, the shank being shown in section.

Fig. 9 is a perspective view of the cut off end of a fastener with the cut end forming retaining flanges.

Fig. 10 is similar to Fig. 9, but illustrates a single retaining flange.

Referring to the drawing in detail, the embodiment illustrated in Fig. 1 is preferably formed of resilient sheet material such as bronze, steel or the like, and comprises a shank 1 which shank is angular or channel-like in cross section so that the fastener is sufficiently rigid to be driven through an asbestos shingle and gypsum sheathing by means of a hammer in the usual manner of driving nails or the like.

The lower end of the fastener is provided with a sharp edged pointed end 2, and adjacent the point the shank is provided with laterally extending wings 3. These wings are elongated to form arcuate upwardly extending resilient arms 4 normally curved outwardly as shown and with their outer ends 5 curved sharply downward to prevent the sharp ends from engaging in the gypsum sheathing after the fastener has been driven therethrough. The upper end of the shank 1 is provided with an outturned tongue or stop 6 to engage the shingle and thereby prevent the fastener from being driven so far into the building structure that it cannot be pulled outwardly for securing purposes. The method of securing the fastener will be described later. The shank 1 extends upwardly at 7 sufficiently above the tongue 6 so that the end or head of the shank may be grasped by means of pliers or the like to pull the fastener outwardly after it has been completely driven into the structure.

Fig. 3 illustrates a sheet metal blank from which the embodiment shown in Fig. 1 may be formed. The blank comprises the shank portion 1a, the wing portions 3a, and the arm portions 4a, and is adapted to be formed so as to provide a central longitudinal channel, corrugation, or groove throughout the entire length of the fastener. The angular cross sectional form of corrugation, shown in Figs. 1 and 2, is satisfactory although other cross sectional contours may be used. The purpose of the channelled or corrugated form is to stiffen the fastener so that it may be driven without bending and to provide a contour which will cause the shank to automatically interlock with a complementary portion of the shingle or with a suitable washer or the like when the shank is cut off by the workman during the fastening operation. In the form shown, the apex of the corrugation is along the dotted line 8. The blank is sheared along the dotted lines 9 to provide the elongated tapered arms 4 which form the extensions of the wings 3. These arms terminate in comparatively sharp points and the elongated taper provides an increasing resilience toward the outer ends of the arms.

Fig. 4 illustrates the method of using the fastener. The support comprises gypsum sheathing 10 which sheathing may be of the usual type having a frangible gypsum core 11 and suitable fabric coverings 12. An asbestos shingle 13 or the like is applied to the sheathing as shown and the fastener is driven through the shingle and sheathing in a position where the fastener will be overlapped by a shingle of the succeeding row.

The fastener is driven through to the position shown by dotted lines and until the tongue 6 engages the shingle as shown. During this driving operation, the resilient arms 4 conform to the shape of the slot made by wings 3 as they are driven through the structure, and as soon as the points 5 of the arms are below the sheathing, the arms spring outwardly substantially to the position shown by dotted lines. The protruding end 7 of the fastener may then be grasped by means of pliers or the like and the fastener pulled outwardly to the full line position or until sufficient resilient pressure is applied, so that the shingle may be securely held after the protruding end of the fastener is cut off in a manner to retain the fastener snugly in place.

The straightening out of the arms 4 during their passage through the shingle and sheathing prevents their returning completely to their original outstanding position. However, the normal downturned curvature of the tips 5 is sufficient to prevent the points of the arms from penetrating or catching in the surface of the sheathing when the fastener is pulled outwardly; therefore, the arms slide on the surface of the sheathing without mutilation thereof, until the desired resilient tension is applied.

Fig. 6 illustrates a portion of the shingle 13 through which a slot 14 is formed by driving the fastener therethrough. It is contemplated that this slot or other suitable opening may be preformed to receive the fastener or to serve as a pilot hole if desired. The slot 14 conforms to the shape of the fastener and provides a tongue or projection 15 on the shingle, which tongue is complementary to the longitudinal corrugation, channel or the like, formed in the fastener. This tongue 15 therefore fits snugly in the channel. After the fastener has been inserted and pulled outwardly to the position shown in Fig. 4, the protruding end of the shank 1 is cut off snugly adjacent the shingle by means of cutting pliers or the like which may be adapted to deform the cut off end as required.

It is common practice in the manufacture of asbestos shingles to provide small perforations through the shingles at appropriate points to receive nails. The fasteners of this invention may be driven through at these points and when so used, the perforation serves as a pilot hole for the point of the fastener, and enables it to be more easily driven. The relative position of the perforation to the slot made by the fastener is shown by the dotted circle 13a in Fig. 6.

In cutting off the shank, the pliers are preferably applied transversely of the corrugation so that the sides of the corrugation are bent inwardly and folded over the tongue 15 of the shingle and the cut edges brought snugly together as shown at 16 (Figs. 5 and 7). This cutting-off operation not only forms the shank over the complementary tongue 15, but also increases the width of the cut off end along and adjacent the line 16 (Fig. 7) so that the fastener is not only locked over the complementary tongue 15, but is also expanded somewhat slightly above the shingle and transversely above and in the slot 14 so that the fastener is locked securely in place against the tension of the resilient arms 4.

With the usual asbestos cement shingles for which this invention is particularly adapted, it is unnecessary to use any other means or method for securing the fastener in place. However, it will be understood that the fastener is adapted for various purposes and may be used for securing various types of shingles, panels, and the like, to various types of supports. It is therefore desirable, in some cases, to provide a washer 17 (Fig. 3) having a slot 18 conforming substantially to the cross-sectional contour of the shank 1. This slot 18 is of sufficient size to loosely receive the shank of the fastener, and may be applied thereto before the tongue 6 is formed so that the washer will be retained loosely on the shank, substantially as illustrated by dotted lines in Fig. 1.

The washer 17 provides a rigid tongue 19, which tongue is complementary to the corrugation, channel, or the like formed in the shank of the fastener. It will be understood, of course, that this corrugation or channel may be of any suitable contour; however, an angular corrugation such as illustrated is preferable.

The fastener is used and applied in the same manner either with or without the washer 17. When the washer is used, the protruding end of the shank, after the fastener has been inserted and moved to the full line position shown in Fig. 4, is cut off immediately above the washer to form the cut off end of the shank over the complementary tongue 19 of the washer, in the same manner as previously described for securing the shank directly to the shingle.

Figs. 9 and 10 illustrate other methods of cutting off and deforming the shank to secure the fastener in place. The cut-off operation is performed with a special tool which, in the embodiment shown in Fig. 9, first shears the side walls of the shank to form tongues 20 which tongues are simultaneously bent outwardly as shown to overlap the shingle or panel 13. The tool then cuts off the protruding end of the shank at 21. This may all be accomplished with a single operation of the tool.

Fig. 10 illustrates a similar embodiment with the exception that only a single tongue 20a is sheared and formed over the shingle and the protruding end of the shank is cut off at 21a.

While particular embodiments of the invention have been shown, it will be understood, of course, that it is not desired that the invention be limited thereto since modifications may be made, and it is therefore contemplated by the appended claims to cover any such modifications as fall within the true spirit and scope of the invention.

Having thus described the invention, what is claimed and desired to be secured by Letters Patent is:

1. A fastener of the character described, comprising a pointed elongated shank, angular in cross section, an arcuate arm sheared from adjacent the side of said shank and extending from adjacent the pointed end generally toward the striking end, the tip of said arm being curved downwardly, said arm being sufficiently resilient to return substantially to its normal outstanding position after being pressed into a position substantially parallel with said shank.

2. A fastener comprising an elongated sheet metal member having a pointed end and a striking end, said member being substantially channel-like in cross section, an elongated resilient arm sheared from said member and normally extending upwardly from adjacent said pointed end and outwardly from said shank, said shank being of materially greater length than said arm.

3. A fastener comprising an elongated pointed shank having an elongated resilient arm projecting upwardly from adjacent the point of said shank, and curved outwardly therefrom, said arm being sufficiently resilient throughout its length so that it will follow through the hole made by said shank when driven through a support and will return substantially to its normal outstanding position when said arm has passed through said support, said arm terminating a material distance short of the striking end of said fastener when said arm is parallel with said shank, a washer slidable on said shaft, and means adjacent the striking end of said shaft to retain said washer thereon.

4. A fastener comprising an elongated pointed shank having an elongated resilient arm projecting upwardly from adjacent the point of said shank, and curved outwardly therefrom, said arm being sufficiently resilient throughout its length so that it will follow through the hole made by said shank when driven through a support and will return substantially to its normal outstanding position when said arm has passed through said support, said arm terminating a material distance short of the striking end of said fastener when said arm is parallel with said shank, said shank being irregular in cross sectional contour, a washer on said shank, said shank and the opening in said washer being of substantially complementary contour so that the deformation of said shank by a combined severing and crushing operation between said washer and the striking end of said shank will retain said washer on said shank against the pressure of said resilient arm.

5. In a fastener of the character described, the combination with an elongated shank substantially channel-like in cross section and having expansible means to engage the back of a support after said fastener has been driven therethrough and then pulled outwardly, of means loosely mounted on said shank to snugly engage the outside of said support, the structure of said shank and said last means being related so that severing and deforming of said shank closely adjacent the outside of said washer will retain said fastener in snugly clamped relationship in said support.

6. A fastener comprising an elongated sheet metal strip having elongated resilient opposed arms sheared substantially longitudinally therefrom and terminating a material distance from one end thereof, said arms being arcuately curved upwardly, outwardly, and downwardly.

7. In a building structure, comprising a sheathing panel and a cover panel, a sheet metal fastener comprising a shank extending through said panels, oppositely disposed and oppositely laterally extending slender resilient arms of great length relative to width and sheared one from each edge of said shank with their flat sides resiliently bearing against the back of said sheathing remote from said shank and their free ends turned outwardly therefrom, the outer end of said shank terminating closely adjacent the surface of said cover panel and having one or more tongues overlapping said surface.

8. In a fastener of the character described the combination with an elongated sheet metal shank having a pointed end and a striking end, and an outstanding stop spaced from the striking end to prevent said striking end from being driven in flush with a support, of expansible means adjacent said pointed end to automatically engage the rear of a support remote from said shank when said fastener is driven therethrough and against said stop and then pulled outwardly by grasping the projecting striking end, said shank being of an irregular cross sectional contour sufficient to cause deformation of the exposed portion by severing said pulled out shank snugly adjacent said support with cutting pliers or the like so that said expansible means and said deformed portion clamp said support snugly therebetween.

9. A sheet metal fastener of the character described comprising an elongated shank angular in cross section and having a pointed end, said pointed end merging into opposed side wings in the general plane of said fastener, said wings each terminating in a long slender and flexible arm extending upwardly from its associated wing and outwardly from said shank, said arms being sheared from the opposed marginal edges of said shank and of sufficient flexibility and length to engage the rear of a support remote from said shank and on opposite sides thereof when said fastener is driven therethrough beyond the free ends of said arms and then pulled outwardly to extend said arms laterally against said support.

10. A fastener of the character described comprising an elongated shank having a pointed end, flexible upwardly and outwardly curved arms of great length relative to their width and extending from adjacent the point of said shank, said arms being sufficiently resilient to enable said fastener to be driven through a shingle and sheathing with said arms following through the hole made by said pointed end and to spring outwardly to extend laterally a relatively great distance from said shank, a laterally extending tongue adjacent the striking end but spaced therefrom to engage the face of said shingle, and to enable the protruding end of said shank to be grasped and said fastener pulled outwardly to apply the tension of said arms against said sheathing, said shank being sufficiently malleable to be severed by cutting pliers or the like snugly adjacent the shingle surface and of a cross sectional contour to be deformed over said shingle by the cutting operation.

11. A structural joint comprising two juxtaposed panels and means for securing said panels together comprising a tension member extending through said panels, abutment means extending laterally from said tension member bearing on the outer face of one of said panels, and two curved leaf springs extending laterally in opposite directions from said tension member having curved leaf portions bearing tangentially on portions of the outer face of the other panel remote from the tension member, said leaf spring member being integral with said tension member and extending tangentially with respect thereto toward said other panel.

LEWIS A. PALEY.
WILLIAM H. YOUNG.